Figure 1:
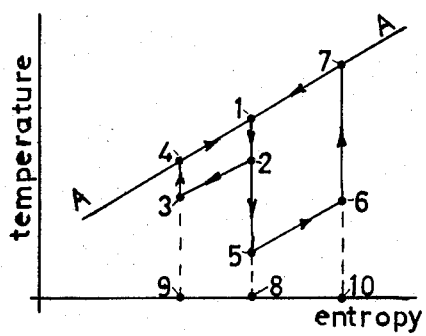

United States Patent [19]
Bolesta

[11] 3,922,871
[45] Dec. 2, 1975

[54] HEATING AND COOLING BY SEPARATION OF FASTER FROM SLOWER MOLECULES OF A GAS

[76] Inventor: Dmytro Bolesta, 9 Jessie St., Sunshine, 3020, Victoria, Australia

[22] Filed: Apr. 15, 1974

[21] Appl. No.: 461,118

[52] U.S. Cl. ............................ 62/5; 62/87; 62/402
[51] Int. Cl.² ........................................... F25B 9/02
[58] Field of Search............................ 62/5, 87, 402

[56] References Cited
UNITED STATES PATENTS

| | | | |
|---|---|---|---|
| 1,952,281 | 3/1934 | Ranque | 62/5 |
| 2,280,585 | 4/1942 | Kapitza | 62/5 |
| 2,790,310 | 4/1957 | Green | 62/5 |
| 2,893,214 | 7/1959 | Hendal | 62/5 |
| 3,296,807 | 1/1967 | Fekete | 62/5 |
| 3,455,117 | 7/1969 | Prelowski | 62/5 |
| 3,522,710 | 8/1970 | Merkulov | 62/5 |

Primary Examiner—William J. Wye

[57] ABSTRACT

This invention relates to a device for heating and cooling a gas or vapour by separating its molecules according to their velocity and collecting them separately as part of original gas having different temperature than originally. The molecules are separated in a cylinder, into which a gas is introduced so as to perform a whirling vortex-like motion. The faster molecules move toward the center of the cylinder and slower molecules will collect near the wall of the cylinder. At the cylinder outlet, the gas is separately discharged from the separate strata and directed to points of use.

6 Claims, 4 Drawing Figures

U.S. Patent   Dec. 2, 1975   3,922,871 section C-C section E-E section D-D

HEATING AND COOLING BY SEPARATION OF FASTER FROM SLOWER MOLECULES OF A GAS

This invention relates to a new method and apparatus for changing of temperature of a gas by separating faster from slower molecules, contained in this gas.

The object of this invention is to provide an efficient and not expensive method and apparatus for heating and cooling of air or other gas or vapour.

At present known heat pump, which is used for heating and cooling, can not reach in practice high performance factor and economy because of complexity of the system. Description of existing art, known as vortex tube: The process in vortex tube, invented by G. J. Ranque, U.S. Pat. No. 1,952,281, can be used to produce cold and warm gas, however thermal efficiency of this process appears to be low and it is not used in similar applications as heat pump, for heating and cooling.

Gas is supplied to vortex tube through a nozzle, which induces gas to form a vortex movement inside the tube, moving at the same time axially toward the end of the tube. Initially, gas entering with tangential direction the tube, forms strong vortex in which gas expands adiabatically forming temperature and pressure gradient which is higher near the wall of tube and lower near the centre of vortex. Because of friction of fast spinning gas against the wall of tube, the rotational component of gas velocity diminishes rather rapidly, being converted into turbulence and finaly into heat and the spinning direction changes gradually into axial direction. This change of direction of flow causes that pressure of cold central core of gas, because of diminishing action of centrifugal force, increases down stream. This pressure increase can stop axial movement of cold central core or even can reverse its flow.

Final effect of this process is that gas collected from outer layer of vortex emerges from the tube hot, being heated by high turbulence, and central core of vortex emerges cold, ideally with the temperature to which it has been adiabatically expanded. Any exchange of heat between hot outer and cold central portion of gas in the tube is not desirable because it will increase the temperature of central portion, destroying the effect and purpose of votrex tube.

The object of this invention is to create a vortex movement of gas not disturbed significantly by friction and turbulence and allow it time for heat exchange between warmer portion of gas, contained in outer stratum, and cooler gas, contained in central stratum of vortex.

During this heat exchange faster molecules of gas, contained in outer stratum of vortex, move toward the centre of vortex to be finally collected, from central portion of vortex, as warm gas and outer stratum of vortex, from which faster molecules moved toward the centre of vortex, will be finally collected as cold gas. Thus, reversing the result obtained by vortex tube and increasing significantly the efficiency of the process.

Figure 2:
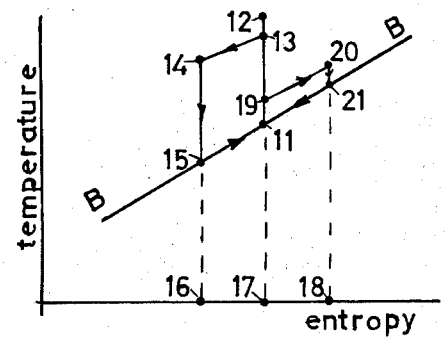
Figure 3:
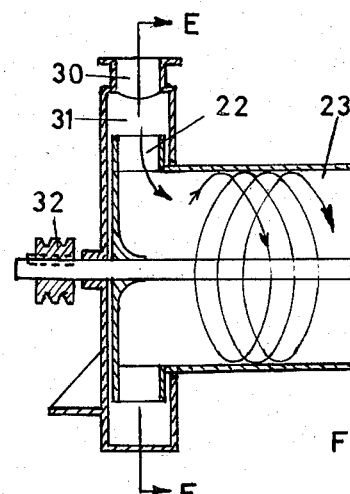

Referring to FIG. 1., FIG. 2. and FIG. 3., the said inconsistency of expression, mentioned by the Examiner, can be illustrattively explained;

As soon as gas enters the cylinder 23, it forms a vortex in which gas expands adiabatically, reaching low pressure and temperature near the shaft shown by point 5 (FIG. 1) or point 19 (FIG. 2) and outer portion of gas, located nearer to the wall of cylinder, expands to higher pressure and temperature reaching point 2 or point 13. As gas moves along the cylinder, performing vortex movement, faster molecules from outer region of vortex move toward the central region increasing the temperature of central region at the end of cylinder from point 5 to point 6, as shown on FIG. 1. or from point 19 to point 20, as shown on FIG. 2. At the same time, the temperature of outer region of vortex, which is depleted from faster molecules, decreases, reaching at the end of cylinder point 3 or point 14. After the pressure of each portion of gas has been brought to desired pressure, by compression to say atmospheric pressure as shown on FIG. 1. or by expansion as shown on FIG. 2., gas collected from central portion of vortex is exhausted through duct 28 as warm gas, having the temperature shown by point 7 or point 21, and gas collected from outer portion of vortex is exhausted through duct 29 as cold gas, having the temperature shown by point 4 or by point 15.

To obtain this result it is essential that the temperature of central portion of wortex is increased by outer portion, of which the temperature correspondingly decreases. This change of temperature is shown by lines between point 5 and 6 and between points 2 and 3 on FIG. 1. and between points 19 and 20 and between points 13 and 14 on FIG. 2.

The effect of this invention can be carried out by the apparatus shown on FIG. 3., when in cylinder 23 a vortex is formed which is not significantly disturbed by turbulence and this vortex will be maintained along the length of cylinder.

Since in vortex movement product of tangential velocity multiplied by radius is approximately constant, the relative velocity between gas and cylinder wall, which causes the turbulence, can be reduced by increased diameter of cylinder until undisturbed vortex in cylinder is formed or by arranging the cylinder rotative, rotating in the direction of vortex spin.

Comparing with known vortex tube as invented, the apparatus shown on FIG. 3. will produce different and completely reverse effect which can not be produced by vortex tube.

This invention is based on a new process by means of which the change of temperature of a gas is effected by separating faster from slower molecules and collecting them separately.

The temperature of a gas is the function of its molecular velocity. The warmer the gas the faster is the movement of its molecules. Not all molecules move with the same velocity. The temperature of a gas being determined by the mean value of the velocity of all its molecules. By separating faster from slower molecules and collecting them separately, as two or more parts of the original gas, the temperature of each part will be different from the temperature of the original gas.

Faster molecules, in order to gain better freedom for their movement, have the tendency to move, through series of collisions with other molecules, toward the region containing less molecules or toward the region containing slower molecules. Externally, this effect will be noticeable as warmer gas appearing to be lighter than cooler and as heat transmission from higher to lower temperature.

The separation of molecules will be effected in a tube or cylinder into which a gas is introduced in such a way that it performs a whirling, vortex like, motion, moving at the same time along the cylinder. The movement of gas in a vortex obeys the law in which approximately velocity of the gas multiplied by the radius is constant.

That is that the velocity increases with decreasing radius and, since this velocity is produced by the internal thermal energy of the gas, the temperature distribution across the vortex will be uneven. The temperature and the pressure will decrease with decreasing radius, creating very favourable condition for faster molecules to move toward the centre of vortex. Externally, this effect will be noticeable as heat transmission from higher temperature, prevailing in outside stratum of vortex, toward the region of lower temperature, prevailing near the centre of vortex. This heat flow will exist until an even temperature along the radius of vortex will be established. This condition may be reached if the gas is permitted to remain in vortex movement sufficiently long time. This time being controlled by the velocity with which gas flows along the cylinder and the length of cylinder. After heat exchange in the vortex, the whirling gas is divided in two or more parts, formed by strata of vortex, and each part is directed into a separate diffuser in which the velocity of whirling gas is transformed into pressure and thereafter the gas, separately for each part, is allowed to escape and can be used as required.

If the time allowed for the gas to stay in vortex movement was sufficiently long, most fast molecules will collect near the centre of vortex. Consequently, the temperature of gas, collected from inner stratum of vortex will be higher than the temperature of gas collected from outer stratum of vortex. Also, since from outer stratum of vortex many fast molecules have been removed, the temperature of this part of gas will be lower than the temperature of original gas.

It shall be noted that the term "gas" is used in order to simplify the description, the term gas shall mean any compressible fluid like air, steam, vapour or any mixture of gases. The meaning of term "molecule" shall also be extended to single atomic gases, in which instead molecules the atoms constitute the smallest part of gas. The term "outside stratum of vortex" shall mean more outer from centre located stratum. The term "inside stratum of vortex" shall mean nearer to the centre located stratum.

In order that the invention be clearly understood and readily put into practical effect, I shall refer now to the illustrative drawings of which;

FIG. 1. and FIG. 2. represent Temperature- Entropy diagram of the process.

Figure 4:
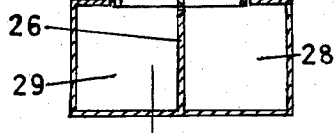
Figure 4:
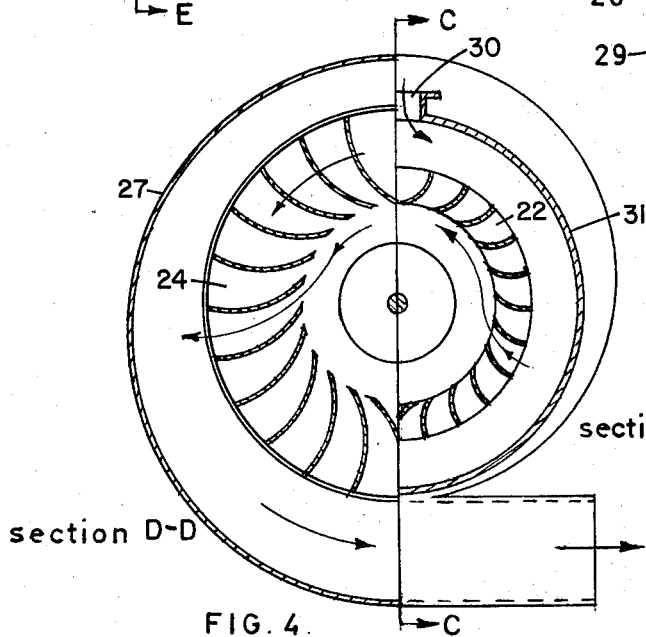

FIG. 3. represents a longitudinal section and FIG. 4. represents a cross section of the apparatus carrying the invention into practical effect. In detail, FIG. 3. is a section on line C—C, shown on FIG. 4. and FIG. 4. is a section on line D—D, shown on FIG. 3.

Referring to FIG. 1., line A—A represents initial pressure line, in most cases this line may represent atmospheric pressure line. The process begins in point 1, which represents the initial condition. From point 1 to point 2 gas is expanded, preferably adiabatically, and its heat energy is converted into velocity of the vortex. At point 2 vortex is divided into two parts. Area located at the left side from line between points 1 and 5 represents change of state of outer stratum and area located at right side from said line represents change of state of inner stratum of vortex. Area marked by points 2-3-9-8-2 represents heat transmitted from outer stratum to inner stratum of vortex in order to equalise the temperature across the vortex. Line between the points 3 and 4 represents compression in the diffuser. This compression will be preferably adiabatic. At point 4, gas collected from outer stratum of vortex issues from the diffuser with the temperature prevailing in point 4. The line between points 2 and 5 represents further expansion, preferably adiabatic, of gas contained in inner stratum of vortex. Area marked by points 5-6-10-8-5 represents heat absorbed by this part of gas and it is equal to heat transmitted from outer stratum. Line between points 6 and 7 represents compression, preferably adiabatic, of this part of gas in the diffuser. At point 7, gas collected from inner stratum of vortex issues from the diffuser with the temperature prevailing in point 7.

It should be noted that lines between points 2 and 3 and between points 5 and 6 represent not the extreme but some mean conditions of particular part of gas.

The areas enclosed by lines with arrows pointing in clockwise direction represent positive power, power generated, and lines with arrows pointing in anticlockwise direction represent negative power, power consumed. Consequently, power required to force this process is represented by the difference of areas; 1-2-3-4-1 less 1-5-6-7-1. The first area representing positive and second area negative work.

Similar, to some degree, phenomenon occurs in the nature in form of cyclones, which are huge vortex movement of air. The cyclones, most probably derive huge destructive power from heat exchange across the vortex. The outer stratum, from which heat is transmitted toward the centre of vortex, encloses area of positive work. Thus, this part of air becomes self generating in power. Heat released by condensing vapour, causing rain, counteracts this effect. The inner stratum of vortex, which absorbs heat from outer stratum, encloses area of negative work. Thus, this part of air becomes retarding part. Depending which area is larger, positive or negative, the cyclone can be of increasing or decreasing intensity.

This invention devices the process and the means to create an artificial cyclone, which may be much smaller in size than in nature but it may be many times more intensive, and provides means to utilize its effect for practical purposes.

Referring to FIG. 2., which represents similar Temperature- Entropy diagram as shown on FIG. 1. with the difference that here the process takes place above the atmospheric pressure line.

Line B—B represents initial pressure line, in most cases this line will represent atmospheric pressure line. The process begins in point 11 by compression of gas to point 12. From point 12 to point 13 the gas expands, preferably adiabatically, and its heat and pressure is converted into velocity of the vortex. At point 13, vortex is divided in two parts. Area located at the left side from line between points 12 and 11 represents change of state of outer stratum and other area represents change of state of inner stratum of vortex. Area marked by points 13-14-16-17-13 represents heat transmitted from outer stratum and absorbed by inner stratum of vortex. Line between points 14 and 15 represents expansion, preferably adiabatic, of this part of gas to initial pressure. At point 15 gas issues from the system with the temperature prevailing in point 15.

The line between points 13 and 19 represents further expansion of gas contained in inner stratum of vortex. Area marked by the points 19-20-18-17-19 represents heat absorbed by this part of gas and it is equal to heat transmitted from outer stratum of vortex. Line between points 20 and 21 represents expansion of this part of gas to initial pressure. The gas issues from the system with the temperature prevailing in point 21.

The power required to force this process is represented by the difference of areas; 13-14-15-11-13 less area 19-20-21-11-19. First area representing negative and second area positive work.

Referring to FIG. 3 and FIG. 4, gas is introduced through the connection 30 into the housing 31 from where it passes through inlet vanes 22 and enters cylinder 23. Inlet vanes 22 are formed in such a way that entering gas performs a whirling, vortex like, motion in the cylinder 23 and moves, at the same time, along the cylinder until it enters diffusers 24 and 25. Plate 33 divides whirling gas in two parts. For this purpose plate 33 has in its centre the opening of such a size that desired division of vortex into two strata is effected. Outer stratum of vortex is forced by the plate 33 to pass through the diffuser 24 and inner stratum passes through the opening in plate 33, located near its centre, and enters diffuser 25. Both parts of gas, after passing the diffusers, are separately collected in stationary volute casing 27 and are separately discharged from outlets 28 and 29. Plate 26, located in volute casing 27, ensures that two parts of gas are discharged without being mixed together. Gas issuing from outlet 28 will be warmer than gas issuing from outlet 29 and also it will be warmer than the original gas entering inlet 22. Gas issuing from outlet 29 will be cooler than original gas which enters inlet vanes 22.

The arrangement as shown on FIG. 3 and FIG. 4 can be made rotatory or stationary. If made rotatory, the rotation of diffusers 24 and 25 and the action of volute casing 27 will create lower pressure in cylinder 23 and air, from the atmosphere, will enter through inlet vanes 22 into the cylinder 23 performing whirling motion and after being divided into two parts is discharged with differentiated temperature from outlets 28 and 29.

In order to reduce friction of whirling gas in cylinder 23, the inlet vanes 22 will be arranged in such a way that gas whirls, preferably, in the same direction as the direction of rotation of cylinder 23. If desired, air or other gas can be introduced with increased pressure into the housing 31 and the whirling motion of gas in the cylinder 23 will be achieved by gas expansion in inlet vanes 22.

The diffusers will be, preferably, formed in such a way that positive work of one part of gas, as shown on FIG. 1 and FIG. 2, will be utilized as driving force, helping to overcome the negative work of other part of gas. Thus, preferably, one diffuser will be formed like a turbine and the other like a fan.

If desired, the whirling gas can be divided in more than two parts. Also there can be more than two diffusers.

The division of whirling gas into desired size of each stratum can be achieved by making the opening in the dividing plate 33 adjustable. The quantity of gas, passing through the apparatus, can be controlled by changing the rotating speed or by changing of initial pressure of gas.

In this arrangement an external heat exchanger is not required. The heat exchange is taking place in the vortex by direct contact of gas.

Power requirement, being the difference of positive and negative work, is relatively small and for this reason high performance factor for heating and cooling may be achieved.

Turbine like arrangement of this system will allow to handle large volume of gas by relatively small apparatus.

While I have shown and described my said process and certain form of apparatus of performing the same I wish it to be understood that I do not desire to be limited to the details shown and described as various modifications in the process and in the apparatus may occur.

Having now fully described and ascertained my said invention and the manner in which it is to be performed I declare that what I claim is;

1. An apparatus for changing the temperature of a gas which comprises; a cylinder, a vaned inlet for gas formed in such a way that a gas enters through it into said cylinder performing whirling vortex like motion, means for dividing whirling gas into desired number of portions formed by strata of vortex, means for bringing the pressure of each portion of said gas to desired pressure at which portion of gas collected from stratum of vortex located more distant from centre of vortex becomes cooler and portion of gas collected from stratum of vortex located nearer the centre of vortex becomes warmer than original gas, and means for exhausting said portions of gas separately from the apparatus.

2. An apparatus according to claim 1 in which said cylinder and said means for bringing the pressure of said portions of gas to desired pressure are arranged rotative and in such a way that portion of gas which is finaly exhausted cooler passes through a power generating element which converts its motion into power and portion of gas which is finaly exhausted warmer passes through a diffuser which converts its motion into pressure.

3. An apparatus according to claim 1 into which a gas with increased pressure is introduced and said cylinder and means for bringing pressure of portions of gas to desired pressure are arranged rotative and in such a way that each portion of gas, passing through it, separately expands to desired pressure.

4. A process for changing the temperature of a gas which comprises; inducing a gas to perform a whirling vortex like movement in which temperature and pressure of gas is lower and its velocity higher in central stratum than in outer stratum of vortex and maintain it in this movement until a desired equalisation of temperature between the central and outer strata of vortex has taken place, dividing the vortex into portions formed by its strata and bringing separately the pressure of gas contained in each portion to desired pressure at which portion of gas collected from central stratum of vortex becomes warmer and portion of gas collected from outer stratum of vortex becomes cooler than original gas which started the process.

5. A process according to claim 4 in which portion of gas collected from outer stratum of vortex is brought to desired pressure and its whirling energy utilized as power and part of gas collected from central stratum of vortex is brought to desired pressure by externally supplied power.

6. A process according to claim 4 in which a gas is compressed and under pressure is induced to perform a whirling vortex like movement and the pressure of said portions of gas is brought separately to desired pressure by expansion of gas.

* * * * *